No. 833,028. PATENTED OCT. 9, 1906.
J. M. DE LOACH.
ATTACHMENT FOR PLOWS.
APPLICATION FILED MAY 23, 1906.
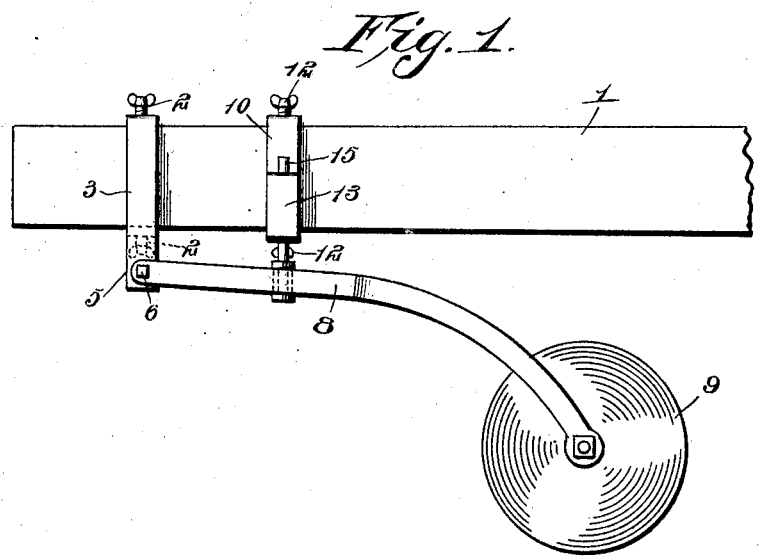
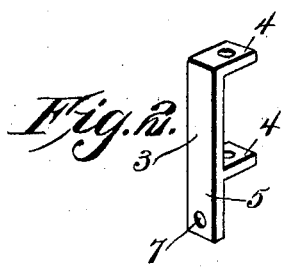
Inventor
J. M. DeLoach
Witnesses
By Victor J. Evans,
Attorney

UNITED STATES PATENT OFFICE.

JOHN M. DE LOACH, OF HOMER, LOUISIANA.

ATTACHMENT FOR PLOWS.

No. 833,028. Specification of Letters Patent. Patented Oct. 9, 1906.

Application filed May 23, 1906. Serial No. 318,362.

*To all whom it may concern:*

Be it known that I, JOHN M. DE LOACH, a citizen of the United States, residing at Homer, in the parish of Claiborne and State of Louisiana, have invented new and useful Improvements in Attachments for Plows, of which the following is a specification.

This invention relates to plow attachments, being directed especially to an improved fender designed to travel adjacent to the row of plants for preventing the young plants from being covered by the dirt thrown by the plow, and has for its objects to provide a comparatively simple inexpensive device of this character which may be conveniently installed for use, one which may be readily applied to either side of the plow-beam, and one which will in practice ride freely over roots or other obstructions without lifting the plow out of the soil.

With these and other objects in view the invention comprises the novel features of construction and combination of parts more fully hereinafter described.

In the accompanying drawings, Figure 1 is a side elevation of a portion of the plow-beam equipped with a fender attachment embodying the invention. Fig. 2 is a perspective view of the bearing-bracket. Fig. 3 is a detail side elevation of the plunger.

Referring to the drawings, 1 designates a plow-beam of the usual or any appropriate construction and material, there being detachably secured to the forward end of the beam, by means of clamping-screws 2, a vertically-disposed bearing bracket or clip 3, having horizontal perforated ears 4, adapted to engage, respectively, above and below the beam to receive the screws 2. The bearing member 3 has a depending portion 5, to which there is pivoted, by means of a horizontal bolt 6, entered through an opening 7, the forward end of a fender-carrying arm or member 8, to the rear end of which there is journaled a fending wheel or disk 9, adapted to travel at the inside of the plow (not shown) and adjacent to the row of plants.

Detachably secured to the beam 1 at a point in rear of and suitably remote from the bearing member 3 is a bearing-clip 10, provided with horizontal portions or arms 11, designed to seat, respectively, above and below the beam for the reception of clamping-screws 12, there being formed on the clip 10 a vertically-disposed rectangular bearing-box 13, having its end walls 14 perforated for the reception of a vertically-movable pressure member or plunger 15, adapted for engagement at its lower end with the fender-arm 8 through the medium of nuts 16, while fixed on the plunger 15 within the box 13 is a bearing-head 17, between which and the upper end of wall 14 of the box there is disposed a normally expanded pressure-spring 18, coiled upon the plunger-rod.

In practice the forward end of the fender-arm 8 is connected with the beam 1 through the medium of the bearing-bracket 3, after which the clip 10 is properly positioned on the beam and the lower end of the plunger 15 connected with the arm 8 by means of the nuts 16, as before explained. The fender is so positioned on the beam that the disk 9 will travel at the inner face of the plow to prevent the latter from throwing clods or the like onto the young plants in the row, it being evident that as the device travels over the ground the disk 9 may ride freely over roots and other obstructions, and this without lifting the plow out of the soil. As the disk rides upward over obstructions a corresponding movement will be imparted to the plunger 15 and the spring 18 be compressed, whereupon the parts will be automatically returned to normal position as soon as the obstruction has been passed.

Having thus described my invention, what I claim is—

In a device of the class described and in combination with a plow-beam, of a fender-arm pivoted at its forward end thereto to swing in a vertical plane, a fender-disk journaled at the rear end of the arm, a bearing-clip attached to the beam and having a bearing-box, a plunger arranged for vertical movement in the box and having its lower end engaged with the arm at a point in rear of the pivotal axis of the latter, said plunger being provided with a bearing-head located in the box, and a normally expanded spring coiled upon the plunger between the upper wall of the box and the bearing-head and designed to act upon the latter for pressing the plunger downward to hold the finger in active position.

In testimony whereof I affix my signature in presence of two witnesses.

JOHN M. DE LOACH.

Witnesses:
DREW FERGUSON,
E. H. FORTSON.